United States Patent Office 3,351,589
Patented Nov. 7, 1967

3,351,589
PROCESS FOR THE MANUFACTURE OF DIURETICALLY AND SALURETICALLY ACTIVE ALKOXYSULFAMYL - ANTHRANILIC ACIDS AND THEIR SALTS
Karl Sturm, Frankfurt am Main, Walter Siedel, Bad Soden, Taunus, and Rudi Weyer, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 7, 1965, Ser. No. 470,231
Claims priority, application Germany, July 11, 1964, F 43,416
8 Claims. (Cl. 260—239.6)

ABSTRACT OF THE DISCLOSURE

Diuretically, saluretically and hypotensively active compounds, i.e., halogen-N-(2' - furylmethyl)-5-alkoxy-sulfamyl-anthranilic acids and addition salts thereof.

The present invention is based on the observation that 4-halogen-N[2' - furylmethyl] - 5 - alkoxysulfamyl - anthranilic acids are distinguished by a high saluretic activity. Said novel anthranilic acid derivatives of the general Formula I

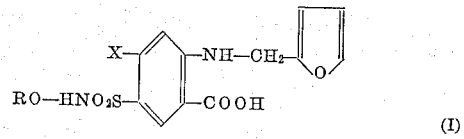

wherein R represents a low-molecular alkyl radical which may be branched and which preferably contains up to 4 carbon atoms and X represents a chlorine or bromine atom and their salts with physiologically tolerable inorganic or organic bases are obtained by reacting compounds of the general Formula II

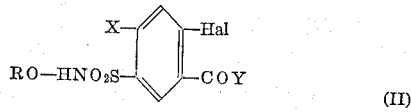

wherein Hal represents a halogen atom and Y represents a hydroxy group, an amino group or a hydrazino group which may be substituted by an alkyl, aralkyl or cycloalkyl group or represents an alkoxy or aralkoxy group, with furfurylamine and, if desired, subjecting the carboxylic ester group, the carbonamide group or the carbonhydrazide group to alkaline hydrolysis and, if desired, reacting the compounds obtained with inorganic or organic bases.

As benzoic acid derivatives there are mentioned, for instance: 2-fluoro-4-chloro-5-methoxy-sulfamyl - benzoic acid, 2-bromo-4-chloro-5-methoxy-sulfamyl-benzoic acid, 2,4-dichloro-5-methoxy-sulfamyl - benzoic acid, 2 - fluoro-4-chloro-5-ethoxy-sulfamyl-benzoic acid, 2,4 - dichloro-5-ethoxy-sulfamyl-benzoic acid, 2-bromo-4 - chloro - 5- ethoxy-sulfamyl-benzoic acid, 2-fluoro-(chloro-, bromo-)-4-chloro-5-propoxy-sulfamyl-benzoic acid, 2-fluoro-(chloro-, bromo)-4-chloro-5-isopropoxy - sulfamyl - benzoic acid, 2-fluoro-(chloro-, bromo-)-4-chloro - 5 - propoxy-sulfamyl-benzoic acid, 2-fluoro-(chloro-, bromo)-4-chloro-5-isopropoxy-sulfamyl-benzoic acid, 2-fluoro-(chloro-, bromo)-4-chloro-5-butoxy-sulfamyl-benzoic acid, 2-fluoro-(chloro-, bromo)-4-chloro-5-isobutoxy-sulfamyl - benzoic acid, 2-fluoro-(chloro-, bromo)-4-chloro - 5 - sec. butoxy-sulfamyl-benzoic acid, 2-fluoro-(chloro-, bromo-)-4-chloro-5-tert. butoxy-sulfamyl-benzoic acid, as well as the corresponding 4-bromo compounds.

It is likewisepossible to start from the esters corresponding to said benzoic acids. As esters derived from aliphatic, cycloaliphatic or araliphatic alcohols, there are mentioned, for instance: methanol, ethanol, propanol, isopropanol, butanol, isobutanol, n-hexanol, decyl alcohol, stearyl alcohol, allyl alcohol, cyclohexyl alcohol, cyclopentyl alcohol, benzyl alcohol or β-phenylethyl alcohol. Esters of lower aliphatic alcohols are preferably used with the above-mentioned benzoic acids.

As starting substances there can likewise be used the amides corresponding to the above-mentioned benzoic acids, for instance the amines which apart from ammonia may be derived from the aliphatic or cycloaliphatic amines mentioned hereafter: Methylamine, ethylamine, propylamine, isopropylamine, butylamine, isobutylamine, sec. butylamine, tert.butylamine, amylamine, hexylamine, benzylamine, cyclohexylamine, cyclopentylamine, cycloheptylamine. The secondary amines corresponding to the above-mentioned primary amines such as dimethylamine and the like are likewise used as amine component of the above-mentioned benzoic acids. Furthermore, benzoic acid amides derived from cyclic secondary amines such as pyrrolidine, piperidine, morpholine, 4-alkyl-piperazine may be used as starting material. Finally, it is possible to start from correspondingly substituted benzoic acid hydrazides, in which case the nitrogen atoms of the hydrazide radical may carry the substituents corresponding to the above-mentioned amines. Preferably, the amides derived from ammonia or low-molecular primary aliphatic amines are used.

In carrying out the process of the present invention, the amine is advantageously used in excess. For instance, for one equivalent of the benzoic acid derivative of the general Formula II, such, for instance, as 2,4-dichloro- or 2-fluoro-4-chloro-5-methoxysulfamyl-benzoic acid, six equivalents of the base are used. In this case, the reaction mixture remains thinly liquid and it is not necessary to use a solvent. Furthermore, the excess of the base accelerates the reaction and provokes increased yields.

In order to reduce the excess of amine, a corresponding amount of a tertiary organic base, for instance, triethylamine or pyridine, and, if required, an inert solvent miscible with water, such, for instance, as glycol-monomethylether or diethylene-glycol-dimethyl ether may be added.

In most cases, the reaction takes place at an elevated temperature, but it may—in certain cases—likewise be carried out at room temperature. Temperatures in the range of 60–140° C. are preferred. The lower temperature range may be considered sufficient, if the halogen atom to be exchanged is fluorine and the carboxyl group present is esterified or amidated. If a compound of the general Formula II is used which contains a free carboxyl group, a reaction temperature raised by about 30° C. is required and a further increase by 40° C. is necessary, if the fluorine atom has to be replaced by a chlorine atom. The upper limit of the above-mentioned temperature range is, therefore, required if in the reactant of the general Formula II Y represents the hydroxyl group and the halogen atom to be exchanged is a chlorine atom.

In order to be worked up, the warm reaction mixture is advantageously introduced into ten to twenty times its amount of acetic acid of 10 percent strength and the condensation product which is generally precipitated in an amorphous state, is separated, for instance, by decantation. For purification, the reaction products with a free carboxyl group are dissolved in warm dilute bicarbonate solution and after decolorization by means of charcoal they are reprecipitated by adding glacial acetic acid.

Intermediate products with esterified carboxyl groups are hydrolysed by heating them for a short period in alkali metal or alkaline earth metal hydroxide solutions, for instance in an excess of 0.5 2 N-sodium hydroxide solution or potassium hydroxide solution to temperatures between 50 and 70° C.; intermediate products containing carbonamide or hydrazide groups are hydrolysed by heating them for 1 to 2 hours with reflux in alkali metal hydroxide solutions, for instance in excessive sodium hydroxide solution or potassium hydroxide solution, and the products of the invention are precipitated, after decolorization of their aqueous-alkaline solution with charcoal, by adding glacial acetic acid. The final purification is advantageously realized by recrystallization from ethanol of 50 to 70% strength.

The 4-halogen-5-sulfamyl-anthranilic acids can be converted into the corresponding salts by reaction with one equivalent of a base, preferably an alkali metal hydroxide, an alkali metal carbonate or an alkaline earth metal hydroxide or an alkaline earth metal carbonate. Especially the alkali metal salts are easily soluble in water and, therefore, particularly suitable for parenteral application. Appropriate organic bases which are physiologically tolerable may likewise be used for the formation of salts.

The dihalogeno-compounds (corresponding to the general Formula II) used as starting substances are prepared according to known processes. It is, for instance, of advantage to react a 2,4-dihalogeno-benzoic acid-5-sulfonic acid chloride with at least one equivalent of a low-molecular O-alkyl-hydroxylamine such, for instance, as O-methyl-hydroxylamine, O-ethyl-hydroxylamine, O-propyl-hydroxylamine, O-isopropyl-hydroxylamine or O-butyl-hydroxylamine, to precipitate the 2,4-dihalogen-5-alkoxy-sulfamyl-benzoic acid that has formed, by pouring the reaction solution into dilute hydrochloric acid, and to purify it by recrystallization from benzene, benzene-petroleum ether or a mixture of ethanol and water. If desired, they are subsequently converted in the usual manner into the corresponding carboxylic esters, carbonamides or hydrazides via the carboxylic acid chlorides prepared by means of thionyl-chloride. The starting substances have hitherto not yet been prepared.
ether or a mixture of ethanol and water. If desired, they are subsequently converted in the usual manner into the corresponding carboxylic esters, carbonamides or hydrazides via the carboxylic acid chlorides prepared by means of thionyl-chloride. The starting substances have hitherto not yet been prepared.

The products obtained according to the process of the invention are novel compounds distinguished by valuable therapeutical properties. They are suitably used, in particular, as diuretics and saluretics.

The products of the invention, especially the 5-methoxysulfamyl derivatives cause the increased separation of, especially, sodium ions and chlorine ions in nearly equivalent proportions, whereas the separation of potassium is only slightly increased. Due to this soduretic activity, the products of the invention do not cause alkalosis of the cellular tissue and, since they are well tolerated, they are appropriate for the edema therapy or, in combination wltih other hypotensively active compounds, for instance, for the permament therapy of essential hypertonia.

The following table shows the values ascertained by diuretic and saluretic tests in rats by means of the new compound 4 - chloro - N-[2′-furylmethyl]-5-methoxysulfamyl-anthranilic acid (I) in comparison with the corresponding pharmacological data of the known product 6 - chloro-7-sulfamyl-3,4-dihydro-1,2,4-benzothiadiazine-1, 1-dioxide (II):

|  | Test Preparation | |
| --- | --- | --- |
|  | I | II |
| Oral dose, mg./kg | 50 | 50 |
| Lipschitz value L | 3.6 | 1.7 |
| Saluresis T/U (Na) | 2.5 | 1.5 |
| Saluresis T/U (K) | 1.0 | 1.3 |
| T/U (Cl) | 2.4 | 1.6 |
| $\frac{(Cl)^{\ominus}}{(Na)^{\oplus}+(K)^{\oplus}}$ | 1.02 | 0.83 |

The following explanations are given with regard to the above table:

The Lipschitz value T/U was ascertained by putting into relation the excretion of urine of a control group of rats to which prior to the start of the test urea was orally given, and the excretion of urea after application of the substance to be tested (I). In this manner a quotient T/U was formed of the values obtained within 5 hours each (cc.).

The method according to which the comparable values contained in Table I were obtained is disclosed in detail by German Patent 1,129,501.

The products of the invention can be administered orally as well as parenterally in the form of their carboxylic acid salts.

The following examples serve to illustrate the invention but they are not intended to limit it thereto:

*Example 1.—4-chloro-N-[2′-furylmethyl]-5-methoxysulfamyl-anthranilic acid*

28.2 grams of 2-fluoro-4-chloro-5-methoxysulfamyl-benzoic acid (0.1 mol) are heated with 58 grams of furfurylamine (0.6 mol) to 100° C. while stirring for 2 hours. The reaction solution cooled to 60° C. is introduced with stirring into 1 liter of acetic acid of 10% strength and the crystalline precipitate is filtered off with suction. The weakly yellowish crude product is taken up in 400 cc. of warm 0.5 N-sodium-bicarbonate solution, the solution is decolorized at room temperature by means of charcoal and adjusted to pH 4.0 by means of glacial acetic acid. After a short standing at room temperature the precipitate is filtered off with suction, washed with water and recrystallized from a mixture of ethanol and water. 32.1 grams of 4-chloro-N-[2′-furylmethyl]-5-methoxysulfamyl-anthranilic acid are obtained in the form of colorless prisms of a melting point of 188° C. (decomposition) (87% of the theory).

*Example 2.—4-bromo-N-[2′-furylmethyl]-5-methoxysulfamyl-anthranilic acid*

32.7 grams of 2-fluoro-5-bromo-methoxysulfamyl-benzoic acid (0.1 mol) are heated with 58 grams of furfurylamine to 110° C. for 2 hours, and the condensation product is isolated as described in Example 1. After recrystallization from a mixture of ethanol and water the melting point of 4-bromo-N-[2′-furylmethyl]-5-methoxysulfamyl-anthranilic acid amounts to 196–198° C. (decomposition). Yield 33.69 grams, i.e. 83% of the theory.

*Example 3.—4-chloro-N-[2′-furylmethyl]-5-exthoxysulfamyl-anthranilic acid*

In an analogous manner there are obtained from 31.5 grams of 2,4-dichloro-5-ethoxysulfamyl-benzoic acid (0.1 mol) and 58 grams of furfurylamine by heating for 2 hours to 130° C. 18 grams of 4-chloro-N-[2′-furylmethyl]-5-ethoxysulfamyl-anthranilic acid of a melting point of 185–186° C. (decomposition); i.e., 48% of the theory.

*Example 4.—4-chloro-N-[2'-furylmethyl]-5-(n-propoxysulfamyl)-anthranilic acid*

In an analogous manner there are obtained from 32.9 grams of 2,4 - dichloro - 5-(n-propoxysulfamyl)-benzoic acid (0.1 mol) and 58 grams of furfurylamine by heating for 2 hours to 130° C.: 17.2 grams of 4-chloro-N-[2'-furylmethyl]-5-(n-propoxysulfamyl)-anthranilic acid of a melting point of 182° C. (decomposition), i.e. 44% of the theory.

*Example 5.—4-chloro-N-[2'-furylmethyl]-5-isopropoxysulfamyl-anthranilic acid*

By reaction of 31.0 grams of 2-fluoro-4-chloro-5-isopropoxy-sulfamyl-benzoic acid with 58 grams of furfurylamine in a manner analogous to that described in Example 1, there are obtained after recrystallization from a mixture of ethanol and water 32.6 grams (84% of the theory) of 4 - chloro - N - [2'-furylmethyl]-5-isopropoxy-sulfamyl-anthranilic acid of a melting point of 198° C. (decomposition).

*Example 6.—4-chloro-N-[2'furylmethyl]-5-(n-butoxysulfamyl)-anthranilic acid*

In an analogous manner there are obtained from 32.4 grams of 2-fluoro-4-chloro-5-(n-butoxysulfamyl)-benzoic acid and 58 grams of furfurylamine by condensation at 100° C. (after recrystallization from a mixture of ethanol and water) 36.0 grams (89% of the theory) of 4-chloro-N-[2'-furylmethyl]-5-(n-butoxysulfamyl)-anthranilic acid of a melting point of 176–177° C. (decomposition).

We claim:
1. 4 - halogen - N-(2'-furylmethyl)-5-alkoxy sulfamyl anthranilic acid of the formula

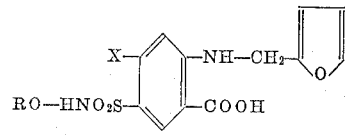

wherein R represents a low molecular alkyl group and X is chlorine or bromine and addition salt thereof with a pharamaceutically acceptable base.

2. 4 - chloro - N-(2'-furylmethyl)-5-methoxy sulfamyl anthranilic acid.

3. 4 - bromo - N-(2'-furylmethyl)-5-methoxy sulfamyl anthranilic acid.

4. 4 - chloro - N - (2'-furylmethyl)-5-ethoxy sulfamyl anthranilic acid.

5. 4 - chloro-N-(2'-furylmethyl)-5-isoproxoxy sulfamyl anthranilic acid.

6. 4 - chloro - N - (2'-furylmethyl)-5-butoxy sulfamyl anthranilic acid.

7. 4 - chloro - N-(2'-furylmethyl)-5-isobutoxy sulfamyl anthranilic acid.

8. 4 - chloro - N - (2'-furylmethyl)-5-ethoxy sulfamyl anthranilic acid mono sodium salt.

No References Cited.

WALTER A. MODANCE, *Primary Examiner.*
JOHN D. RANDOLPH, *Examiner.*
H. I. MOATZ, *Assistant Examiner.*